United States Patent
Zhou et al.

(10) Patent No.: US 7,715,645 B2
(45) Date of Patent: May 11, 2010

(54) METHODS TO ESTIMATE NOISE VARIANCE FROM A VIDEO SEQUENCE

(75) Inventors: Zhi Zhou, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1515 days.

(21) Appl. No.: 10/991,265

(22) Filed: Nov. 17, 2004

(65) Prior Publication Data

US 2006/0103765 A1    May 18, 2006

(51) Int. Cl.
    *G06K 9/36* (2006.01)
(52) U.S. Cl. .................. 382/254; 382/274; 382/275; 358/3.26; 358/3.27
(58) Field of Classification Search ............ 382/209, 382/219, 252, 274, 275; 358/3.26, 3.27, 358/463; 348/14.15, 208.4
See application file for complete search history.

(56) References Cited

U.S. PATENT DOCUMENTS

| | | | | |
|---|---|---|---|---|
| 5,471,252 A * | 11/1995 | Iu | | 348/699 |
| 5,490,247 A * | 2/1996 | Tung et al. | | 345/501 |
| 5,585,843 A * | 12/1996 | Ishizuka et al. | | 348/208.13 |
| 5,594,813 A * | 1/1997 | Fandrianto et al. | | 382/236 |
| 5,844,627 A * | 12/1998 | May et al. | | 348/607 |
| 5,946,041 A * | 8/1999 | Morita | | 348/416.1 |
| 6,014,181 A * | 1/2000 | Sun | | 348/699 |
| 6,285,413 B1 * | 9/2001 | Akbayir | | 348/678 |
| 6,285,797 B1 * | 9/2001 | Lubin et al. | | 382/254 |
| 6,335,950 B1 * | 1/2002 | Kohn | | 375/240.16 |
| 6,529,638 B1 * | 3/2003 | Westerman | | 382/275 |
| 6,665,342 B1 * | 12/2003 | Brown et al. | | 375/240.16 |
| 6,757,442 B1 * | 6/2004 | Avinash | | 382/274 |
| 6,807,231 B1 * | 10/2004 | Wiegand et al. | | 375/240.12 |
| 7,027,054 B1 * | 4/2006 | Cheiky et al. | | 345/473 |
| 7,033,083 B2 * | 4/2006 | Obayashi et al. | | 384/623 |
| 7,046,307 B1 * | 5/2006 | Hui | | 348/700 |
| 7,050,058 B2 * | 5/2006 | Liang et al. | | 345/473 |
| 7,075,993 B2 * | 7/2006 | O'Brien, Jr. | | 375/240.27 |
| 7,084,071 B1 * | 8/2006 | Dakshina-Murthy et al. | | 438/717 |
| 7,087,021 B2 * | 8/2006 | Paternostro | | 600/443 |
| 7,088,777 B2 * | 8/2006 | Yu et al. | | 375/240.28 |
| 7,113,185 B2 * | 9/2006 | Jojic et al. | | 345/420 |

(Continued)

OTHER PUBLICATIONS

P. Besl and R. Jain, "Segmentation through variable-order surface fitting", IEEE Trans. Pattern Analysis and Machine Intelligence, Mar. 1988, pp. 167-192, vol. 10, No. 2.

(Continued)

*Primary Examiner*—Yosef Kassa
(74) *Attorney, Agent, or Firm*—Kenneth L. Sherman, Esq.; Michael Zarrabian, Esq.; Myers Andreas Sherman LLP

(57) ABSTRACT

A noise estimation system that estimates noises in a sequence of video frames, uses a an image structure remover and a noise variance calculator. The image structure remover computes the difference over a local window in two consecutive frames. The noise variance calculator estimates the noise variance (standard deviation) from the distribution of the local difference. If there is no motion or small motion between two consecutive frames, the image structure can be removed by calculating the local difference, whereby very robust estimation is obtained.

29 Claims, 6 Drawing Sheets

U.S. PATENT DOCUMENTS 7,236,177 B2 * 6/2007 Sih et al. .................... 345/572

OTHER PUBLICATIONS

K. Rank, M. Lendl, and R. Unbehauen, "Estimation of image noise variance," IEE Proc.-Vision, Image and Signal Processing, Apr. 1999, pp. 80-84, vol. 146, No. 2.

B. R. Corner, R. M. Narayanan, and S. E. Reichenbach, "Noise estimation in remote sensing imagery using data masking," Int. J. Remote Sensing, 2003, pp. 689-702, vol. 24, No. 4.

P. Meer, J. M. Jolion, and A. Rosenfeld, "A fast parallel algorithm for blind estimation of noise variance," IEEE Trans. Pattern Analysis and Machine Intelligence, Feb. 1990, pp. 216-223, vol. 12, No. 2.

R. Bracho and A. C. Sanderson, "Segmentation of images based on intensity gradient information," in Proceedings of CVPR-85 Conf. on Computer Vision and Pattern Recognition, San Francisco, 1985, pp. 341-347.

H. Voorhees and T. Poggio, "Detecting blobs as textons in natural images," in Proc. DARPA IV Workshop, Feb. 1987, pp. 892-899.

J. S. Lee, "Refined filtering of image noise using local statistics," Computer Vision, Graphics and Image Processing, 1981, pp. 380-389, vol. 5.

S. I. Olsen, "Estimation of noise in images: An evaluation," CVGIP, Praph. Models Image Proc., 1993, pp. 319-323, vol. 55.

* cited by examiner

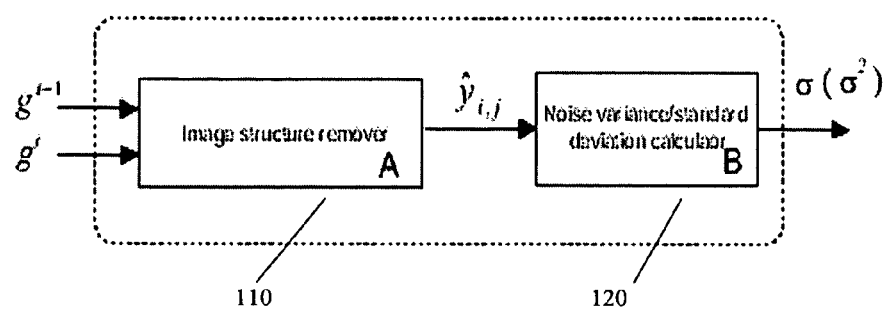
Fig. 1. Temporal noise estimation. 100

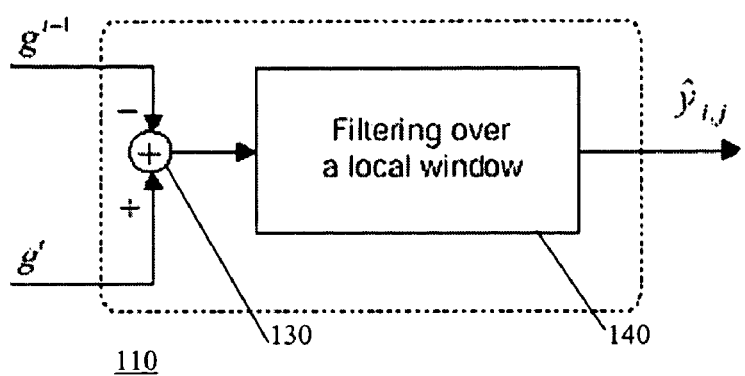
Fig. 2. Image structure remover.

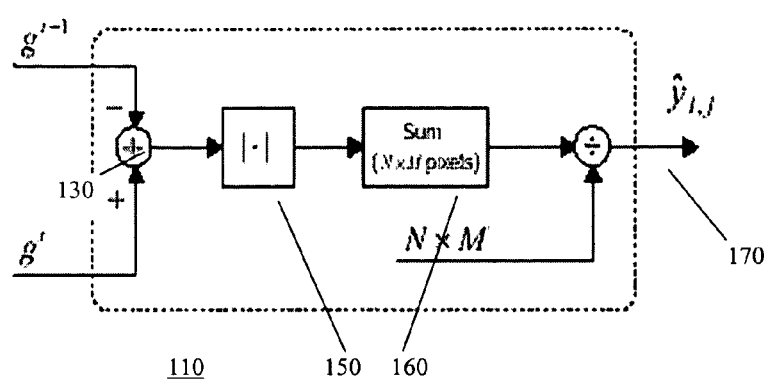
Fig. 3. MAE calculator.

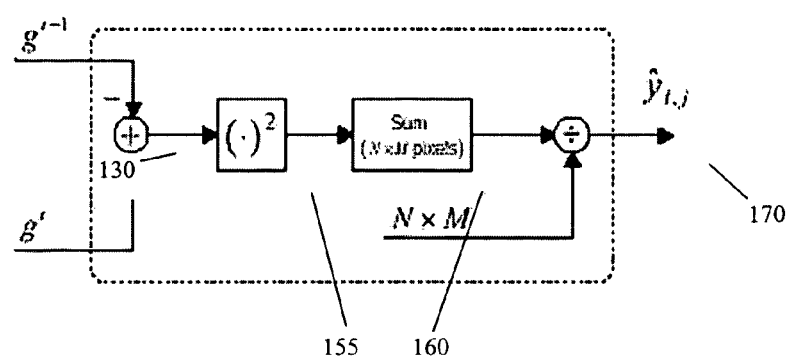
Fig. 4. MSE calculator.

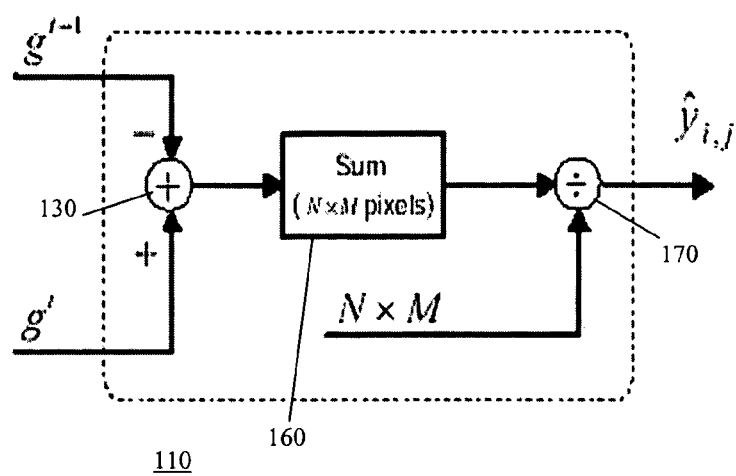
Fig. 5. DLM calculator.

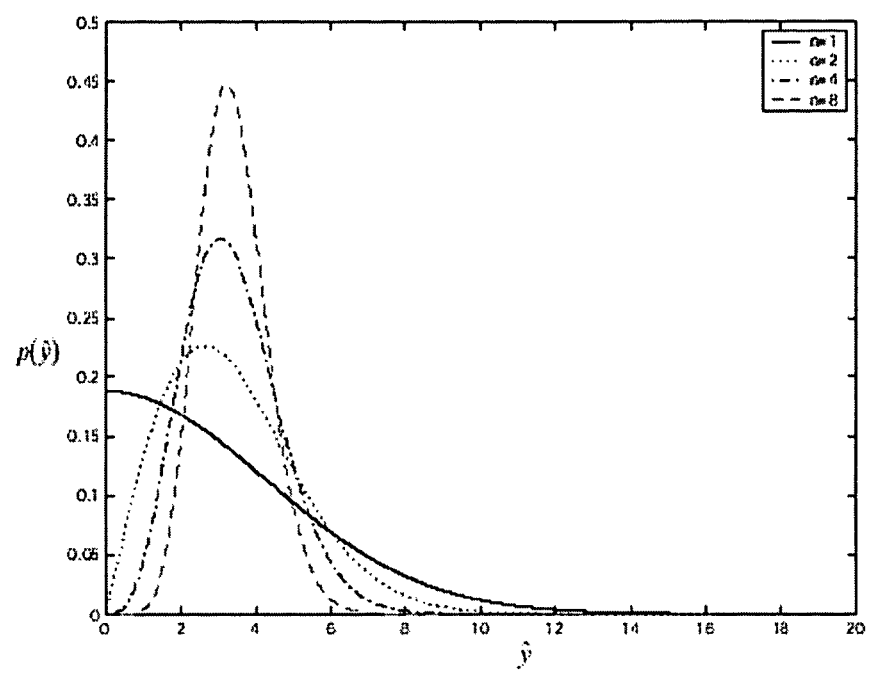
Fig. 6. The histogram distribution of MAE ($k = H \times W$; $\sigma_0 = 3.0$).

METHODS TO ESTIMATE NOISE VARIANCE FROM A VIDEO SEQUENCE

FIELD OF THE INVENTION

The present invention relates generally to video processing, and more particularly to noise estimation in video signals.

BACKGROUND OF THE INVENTION

Noise estimation is required in many algorithms to process images or video optimally. For example, in TV systems, noise reduction is often applied as a first step to obtain noise-free video sequences. An optimal algorithm of noise reduction is noise adaptive, which first estimates the noise variance of input video sequences, and then performs noise reduction. Noise estimation is very important in this case, because overestimation leads to image blurring and underestimation leads to insufficient noise reduction. The input image g is generally assumed to be corrupted by additive Gaussian noise $N(0, \sigma_0^2)$:

$$g = f + n \quad (1)$$

where f is the original noise-free image and the noise $n \sim N(0, \sigma_0^2)$. For each pixel:

$$g_{ij} = f_{ij} + n_{ij} \quad (2)$$

where (i, j) is the coordinate of each pixel, $g_{ij}$ and $f_{ij}$ denote the pixel values in image g and f, and $n_{ij} \sim N(0, \sigma_0^2)$. The problem of noise estimation is to estimate the noise variance $\sigma_0^2$ of the contaminated image g without the priori information of the original image f.

A straightforward method of noise estimation is to compute the expectation of the local variance of image g. This method suffers from the image structure which causes overestimation. To overcome this problem, several methods have been proposed. One method excludes the local variance if the gradient magnitude of the corresponding pixel is greater than a preset threshold. However, the gradient magnitude is also related to noise variance, so it is hard to find an appropriate threshold. Another method, first extracts the noise component with little structure by applying high-pass filters to the contaminated image g, and then performs noise estimation on the noise component. Another method decomposes the image into a pyramid structure of different block sizes. The noise variance is estimated from a sequence of four smallest block-based local variance at each level. Yet in another method, Reyleigh distribution is fitted to the magnitude of the intensity gradient. The noise variance is estimated based on the attribute that the Rayleigh probability density function reaches maximum at value $\sigma_0$. Other methods estimate multiplicative as well as additive noise. Overall, all of the above methods utilize the spatial local statistics to estimate noise variance. However, estimation accuracy depends on the separation of the noise component and the real image signal. The robustness degrades greatly if most of the image contains complicated structure.

BRIEF SUMMARY OF THE INVENTION

The present invention addresses the limitations of conventional spatial noise estimation. According to an embodiment of the present invention, noise estimation includes an image structure remover and a noise variance calculator. The image structure remover computes the difference over a local window in two consecutive frames, such as using sum of absolute error (SAE), mean absolute error (MAE), sum of square error (SSE), mean square error (MSE) and difference of local mean (DLM) etc. The noise variance calculator estimates the noise variance (standard deviation) from the distribution of the local difference. If there is no motion or small motion between two consecutive frames, the image structure can be removed by calculating the local difference, whereby very robust estimation is obtained.

Other embodiments, features and advantages of the present invention will be apparent from the following specification taken in conjunction with the following drawings.

BRIEF DESCRIPTION OF THE DRAWINGS

FIG. 1 shows an example block diagram of an embodiment of a temporal noise estimation system according to the present invention.

FIG. 2 shows an example block diagram of a scheme for computing the local difference according to an embodiment of the present invention.

FIG. 3 shows an example of computing MAE as the local difference, according to an embodiment of the present invention.

FIG. 4 shows an example of computing MSE as the local difference according to an embodiment of the present invention.

FIG. 5 shows an example of computing DLM as the local difference, according to an embodiment of the present invention.

FIG. 6 shows an example of the distribution (histogram) of MAE, according to an embodiment of the present invention.

DETAILED DESCRIPTION OF THE INVENTION

Referring to the drawings, preferred embodiment of the present invention are described hereinbelow, wherein first an analysis of Gaussian distributed signals is provided as a foundation for noise estimation according to embodiment of the present invention.

Analysis of Gaussian Distributed Signals

Denoting $g^t$ to be the current input noisy frame at time t, and $g^{t-1}$ to be the previous input noisy frame, it is assumed that $g^t$ and $g^{t-1}$ both are corrupted by Gaussian noise with noise variance $\sigma_0^2$. Let $x = g^t - g^{t-1}$, which is zero mean Gaussian distributed random variable (if no motion exists between $g^t$ and $g^{t-1}$) satisfying relations (3) and (4):

$$x \sim N(0, \sigma_x^2) \quad (3)$$

$$\sigma_x^2 = 2\sigma_0^2 \quad (4)$$

Let x' be the average of k samples of x as shown in relation (5) below:

$$x' = (x_1 + x_2 + \ldots + x_k)/k \quad (5)$$

The variance of x' (i.e., $\sigma_{x'}^2$) can be calculated based on relation (6) below:

$$\sigma_{x'}^2 = \frac{\sigma_x^2}{k} \quad (6)$$

$$= \frac{2\sigma_0^2}{k}.$$

Assuming $y = |g^t - g^{t-1}|$, because $y = |x|$, the probability density function (p.d.f.) of y can be obtained as shown in relation (7) below:

$$p(y) = \begin{cases} \frac{2}{\sqrt{2\pi} \cdot \sigma_x} \cdot e^{-\frac{y^2}{2\sigma_x^2}}, & y > 0; \\ \frac{1}{\sqrt{2\pi} \cdot \sigma_x}, & y = 0; \\ 0, & y < 0. \end{cases} \quad (7)$$

The first order expectation of y can be calculated as in relation (8) below:

$$\begin{aligned} E(y) &= \int_0^\infty y \cdot p(y) \cdot dy \quad (8) \\ &= \int_0^\infty y \cdot \frac{2}{\sqrt{2\pi} \cdot \sigma_x} \cdot e^{-\frac{y^2}{2\sigma_x^2}} \cdot dy \\ &= -\int_0^\infty \frac{2\sigma_x}{\sqrt{2\pi}} \cdot e^{-\frac{y^2}{2\sigma_x^2}} \cdot d\left(-\frac{y^2}{2\sigma_x^2}\right) \\ &= -\frac{2\sigma_x}{\sqrt{2\pi}} \cdot e^{-\frac{y^2}{2\sigma_x^2}} \Big|_0^\infty \\ &= 0 - \left(-\frac{2\sigma_x}{\sqrt{2\pi}}\right) \\ &= \sqrt{\frac{2}{\pi}} \cdot \sigma_x \\ &= \frac{2}{\sqrt{\pi}} \cdot \sigma_0. \end{aligned}$$

The second order expectation of y can be calculated as in relation (9) below:

$$\begin{aligned} E(y^2) &= E(|x|^2) \quad (9) \\ &= E(x^2) \\ &= \sigma_x^2 \\ &= 2\sigma_0^2. \end{aligned}$$

From relations (8) and (9) above, the variance of y can be obtained as in relation (10) below:

$$\begin{aligned} \sigma_y^2 &= E(y^2) - (E(y))^2 \quad (10) \\ &= \sigma_x^2 - \left(\sqrt{\frac{2}{\pi}} \cdot \sigma_x\right)^2 \\ &= \frac{\pi - 2}{\pi} \cdot \sigma_x^2 \\ &= \frac{\pi - 2}{\pi} \cdot 2\sigma_0^2. \end{aligned}$$

Let y' be the average of k samples of y as shown in relation (11) below:

$$y' = \frac{y_1 + y_2 + \ldots + y_k}{k}. \quad (11)$$

The first order expectation of y' is:

$$\begin{aligned} E(y') &= E(y) \quad (12) \\ &= \frac{2}{\sqrt{\pi}} \cdot \sigma_0. \end{aligned}$$

The variance of y' can be calculated as in relation (13) below:

$$\begin{aligned} \sigma_{y'}^2 &= \frac{\sigma_y^2}{k} \quad (13) \\ &= \frac{2(\pi - 2)}{\pi k} \cdot \sigma_0^2. \end{aligned}$$

Assuming $z = (g^t - g^{t-1})^2$, then $z = x^2$. The first order expectation of z can be obtained as in relation (14) below:

$$\begin{aligned} E(z) &= E(x^2) \quad (14) \\ &= \sigma_x^2 \\ &= 2\sigma_0^2. \end{aligned}$$

Let z' be the average of k samples of z as shown in relation (15) below:

$$z' = \frac{z_1 + z_2 + \ldots + z_k}{k}. \quad (15)$$

The first order expectation of z' is as in relation (16) below:

$$\begin{aligned} E(z') &= E(z) \quad (16) \\ &= 2\sigma_0^2. \end{aligned}$$

Noise Estimation

FIG. 1 shows a block diagram of a temporal noise estimation system 100 comprising an image structure remover 110 and a noise variance calculator 120, according to an embodiment of the present invention. The image structure remover 110 computes the difference over a local window in two consecutive frames. The noise variance calculator 120 estimates the noise variance (standard deviation) from the distribution of the local difference. If there is no motion or small motion between two consecutive frames, the image structure can be removed by calculating the local difference, whereby very robust estimation can be obtained.

The image structure remover 110 (Block A) computes the local difference, $\hat{y}_{i,j}$, and the calculator 120 (Block B) estimates a certain parameter of the distribution of $\hat{y}$ which is related to the noise variance (standard deviation) of the video sequence.

The local difference, $\hat{y}_{i,j}$, is a function of two successive images as shown in relation (17) below:

$$\hat{y}_{i,j} = F(g^t, g^{t-1}) \quad (17)$$

The local difference is computed over a local window of size H×W in two successive image frames.

The general scheme of the image structure remover 110 is shown in FIG. 2, which includes a difference block 130 for obtaining the difference between two consecutive image frames, and a filter block 140 for filtering that difference over a local window to obtain the local difference. Examples of computing the local difference in block 140 include mean absolute error (MAE), mean square error (MSE) and difference of local mean (DLM). As those skilled in the art will recognize, other examples and variations thereof are possible.

1) FIG. 3 shows an example image structure remover 110 implementing an MAE process ($F_{MAE}$) using absolute value, summer and division blocks 150, 160 and 170, respectively, according to relation (18) below:

$$\hat{y}_{i,j} = F_{MAE}(g^t, g^{t-1}) \qquad (18)$$

$$= \frac{\sum_{p=-\frac{H}{2}}^{\frac{H}{2}} \sum_{q=-\frac{W}{2}}^{\frac{W}{2}} |g^t_{i+p,j+q} - g^{t-1}_{i+p,j+q}|}{H \times W}.$$

2) FIG. 4 shows an example image structure remover 110 implementing an MSE process ($F_{MSE}$) using square, summer and division blocks 155, 160 and 170, respectively, according to relation (19) below:

$$\hat{y}_{i,j} = F_{MSE}(g^t, g^{t-1}) \qquad (19)$$

$$= \frac{\sum_{p=-\frac{H}{2}}^{\frac{H}{2}} \sum_{q=-\frac{W}{2}}^{\frac{W}{2}} (g^t_{i+p,j+q} - g^{t-1}_{i+p,j+q})^2}{H \times W}.$$

3) FIG. 5 shows an example image structure remover 110 implementing an DLM process ($F_{DLM}$) using summer and division blocks 160 and 170, respectively, according to relation (20) below:

$$\hat{y}_{i,j} = F_{DLM}(g^t, g^{t-1}) \qquad (20)$$

$$= \frac{\sum_{p=-\frac{H}{2}}^{\frac{H}{2}} \sum_{q=-\frac{W}{2}}^{\frac{W}{2}} (g^t_{i+p,j+q} - g^{t-1}_{i+p,j+q})}{H \times W}.$$

If there is no motion or small motion between two consecutive frames, the image structure can be removed by calculating such local difference. To remove the effects of the motion, the image structure remover 110 (FIG. 1) can be extended to a motion compensated method. For example, the motion compensated MAE ($F_{MCMAE}$) can be obtained according to relation (21) below:

$$\hat{y}_{i,j} = F_{MCMAE}(g^t, g^{t-1}) \qquad (21)$$

-continued $$= \frac{\sum_{p=-\frac{H}{2}}^{\frac{H}{2}} \sum_{q=-\frac{W}{2}}^{\frac{W}{2}} |g^t_{i+p,j+q} - g^{t-1}_{i+p+dy,j+q+dx}|}{H \times W},$$

where (dx, dy) is the motion vector obtained by motion estimation.

The motion compensated MSE can be obtained in the same manner as $F_{MCMAE}$ above except for using a square operator instead of the absolute value calculation in relation (21) above. Further, the motion compensated DLM can also be obtained in the same manner as $F_{MCMAE}$ above by removing the absolute value calculation in relation (21) above.

Assuming $\hat{y}_{i,j}$ satisfies the distribution of a random variable, the calculator 120 (FIG. 1) estimates a certain parameter, α, of the distribution of ŷ. The parameter α is related to the noise variance (standard deviation) of the video sequence. The noise variance (standard deviation) can be computed from α. Example calculations of the noise variance by the calculator 120 are provided below, however as those skilled in the art recognize other versions are possible.

1) Using MAE as the local difference:

a) where α is the estimation of the first order expectation of ŷ, from relation (12) above, α can be calculated according to relation (22) below:

$$\alpha \simeq E(\hat{y}) = \frac{2}{\sqrt{\pi}} \cdot \sigma_0. \qquad (22)$$

Then, the noise standard deviation can be estimated according to relation (23) below:

$$\sigma_{est} = \frac{\sqrt{\pi}}{2} \cdot \alpha. \qquad (23)$$

b) where α is the estimation of the variance of ŷ, from relation (13) above, α can be calculated according to relation (24) below:

$$\alpha \simeq \sigma_{\hat{y}}^2 = \frac{2(\pi - 2)}{\pi HW} \cdot \sigma_0^2. \qquad (24)$$

Then, the noise variance can be estimated according to relation (25) below:

$$\sigma_{est}^2 = \frac{\pi HW}{2(\pi - 2)} \cdot \alpha. \qquad (25)$$

c) α corresponds to the maximum histogram value of ŷ as shown in relation (26) below:

$$\alpha = \underset{\hat{y}}{\operatorname{argmax}}\, h(\hat{y}). \qquad (26)$$

h(ŷ) is the histogram (or distribution curve) of ŷ, and is displayed by several example in FIG. 6, wherein ŷ (a random variable) is the average absolute difference on a local window. In the example of FIG. 6, k=1,2,4,8, where k is the number of pixels in the local block to calculate ŷ. In one example, if the block size is 3×3, then one pixel is discarded and eight pixels are used (dividing by 8 becomes shifting 3 bits in hardware) to calculate ŷ, where ŷ's distribution is the curve of k=8 in FIG. 6. The maximum histogram position is very close to E(ŷ) when block size k=H×W is large enough. As such, in this case, the noise standard deviation can also be estimated by relation (23) above.

2) Using MSE as the local difference:
a) where α is the estimation of the first order expectation of ŷ, from relation (16) above α can be obtained according to relation (27) below:

$$\alpha \approx E(\hat{y}) = 2\sigma_0^2 \qquad (28)$$

The noise variance can be estimated according to relation (28) below:

$$\sigma_{est}^2 = \frac{1}{2}\alpha. \qquad (28)$$

b) where α corresponds to maximum histogram value of ŷ, as shown in relation (26) above. The estimated α is very close to E(ŷ) when block size k=H×W is large enough. As such, the noise variance can be estimated a in relation (28) above.

3) Using DLM as the local difference:
α is the estimation of the variance of ŷ, and from relation (6) above α can be determined according to relation (29) below:

$$\alpha \approx \sigma_{\hat{y}}^2 = \frac{2}{HW} \cdot \sigma_0^2. \qquad (29)$$

The noise variance can then be estimated according to relation (30) below:

$$\sigma_{est}^2 = \frac{HW}{2} \cdot \alpha. \qquad (30)$$

Because the image structure remover 110 computes the difference over a local window in two consecutive frames, and the calculator 120 estimates the noise variance from the distribution of the local difference, if there is no motion or small motion between the two consecutive frames, the image structure is removed by calculating the local difference, leading to very robust noise estimation even if most of the image contains complicated structure.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated. The aforementioned example architectures above according to the present invention, can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of video noise estimation for a sequence of video image frames, comprising:
   determining local differences between a portion of a frame and a corresponding portion of a subsequent frame;
   determining a statistical distribution of the local differences; and,
   based on the statistical distribution, estimating a noise variance.

2. The method of claim 1, wherein determining the difference comprises computing a mean absolute error for the two frames, wherein determining the statistical distribution comprises determining a histogram of the local differences.

3. The method of claim 2, wherein estimating the noise variance further comprises determining the value associated with the maximum frequency of the histogram.

4. The method of claim 3, wherein determining the difference comprises computing a mean square error for the two frames.

5. The method of claim 3, wherein determining the difference comprises computing a sum of square error for the two frames.

6. The method of claim 3, wherein determining the difference comprises computing a difference of local mean for the two frames.

7. The method of claim 3, wherein determining the difference comprises determining the difference of two matching blocks in the two frames, respectively, wherein the two matching blocks can be searched by motion estimation.

8. The method of claim 7, wherein estimating the noise variance comprises estimating a first order expectation for the distribution.

9. The method of claim 7, wherein estimating the noise variance comprises estimating a variance for the distribution.

10. The method of claim 7, wherein estimating the noise variance comprises estimating a maximum histogram position for the distribution.

11. The method of claim 10, wherein the two frames are consecutive frames.

12. A video noise estimation system that estimates video noise for a sequence of video image frames, comprising:
    an image structure remover that determines local differences between a portion of a frame and a corresponding portion of a subsequent frame; and
    a noise estimator that determines a statistical distribution of the local differences and estimates the noise variance based on the statistical distribution.

13. The system of claim 12, wherein the statistical distribution further comprises a histogram of the local differences, wherein the image structure remover further determines the difference by computing a mean absolute error for the two frames.

14. The system of claim 13, wherein estimating the noise variance further comprises determining the value associated with the maximum frequency of the histogram, wherein the image structure remover further determines the difference by computing a sum of absolute error for the two frames.

15. The system of claim 13, wherein the image structure remover further determines the difference by computing a mean square error for the two frames.

16. The system of claim 13, wherein the image structure remover further determines the difference by computing a sum of square error for the two frames.

17. The system of claim 13, wherein the image structure remover further determines the difference by computing a difference of local mean for the two frames.

18. The system of claim 17, wherein the image structure remover determines the difference of two matching blocks in the two frames, respectively, wherein the two matching blocks can be searched by motion estimation.

19. The system of claim 17, wherein the noise estimator further estimates the noise variance by estimating a first order expectation for the distribution.

20. The system of claim 17, wherein the noise estimator further estimates the noise variance by estimating a variance for the distribution.

21. The system of claim 17, wherein the noise estimator further estimates the noise variance by estimating a maximum histogram position for the distribution.

22. The system of claim 21, wherein the two frames are consecutive frames.

23. The method of claim 11, wherein the frame and the subsequent frame are actual frames.

24. The method of claim 23, wherein determining a difference between a portion of a frame and a corresponding portion of a subsequent frame comprises determining a local difference between a pixel in the frame and a corresponding pixel in the subsequent frame.

25. The method of claim 24, wherein estimating a noise variance as a function of a statistical distribution of the difference further comprises compensating for the effects of motion between the frame and the subsequent frame.

26. A method of video noise estimation for a sequence of video image frames, comprising:
   determining a local noise difference between a local window of a frame and a corresponding local window of a successive frame;
   estimating a noise variance as a function of a statistical histogram of the local noise difference,
   determining a motion value between the two successive frames based on the noise variance; and
   removing an image structure if the motion value is less than a predetermined motion value.

27. The method of claim 26, wherein removing the image structure is based on calculating the local noise difference.

28. A video noise estimation system that estimates video noise for a sequence of video image frames, comprising:
   an image structure remover that determines a local noise difference between a window of a frame and a corresponding window of a successive frame;
   a noise estimator that estimates the noise variance as a function of the statistical histogram of the local noise difference; and
   a motion estimator configured to estimate a motion value between the two successive frames,
wherein the image structure remover removes an image structure upon the motion value being less than a predetermined motion value.

29. The system of claim 28, wherein the image structure remover removes the image structure based on calculating the local noise difference.

* * * * *